United States Patent
Mandelli et al.

(10) Patent No.: US 12,341,593 B2
(45) Date of Patent: Jun. 24, 2025

(54) APPARATUS COMPRISING AT LEAST ONE PROCESSOR

(71) Applicant: Nokia Solutions and Networks Oy, Espoo (FI)

(72) Inventors: Silvio Mandelli, Ludwigsburg (DE); Jinfeng Du, West Windsor, NJ (US)

(73) Assignee: Nokia Solutions & Networks Oy, Espoo (FI)

( * ) Notice: Subject to any disclaimer, the term of this patent is extended or adjusted under 35 U.S.C. 154(b) by 0 days.

(21) Appl. No.: 18/203,690

(22) Filed: May 31, 2023

(65) Prior Publication Data
US 2023/0396306 A1 Dec. 7, 2023

(30) Foreign Application Priority Data
Jun. 1, 2022 (FI) .................................. 20225482

(51) Int. Cl.
*H04W 16/28* (2009.01)
*H04B 7/06* (2006.01)
(52) U.S. Cl.
CPC ........ *H04B 7/06958* (2023.05); *H04W 16/28* (2013.01)
(58) Field of Classification Search
CPC .... H04B 7/0695; H04B 7/088; H04B 7/0617; H04B 7/0408; H04W 16/28; H04W 72/046; H04W 72/21; H04W 72/0453; H04W 74/0833; H04W 72/23
See application file for complete search history.

(56) References Cited

U.S. PATENT DOCUMENTS

| | | |
|---|---|---|
| 2018/0279150 A1 | 9/2018 | He et al. .......................... 24/10 |
| 2018/0317214 A1 | 11/2018 | Ding et al. |
| 2019/0191440 A1 | 6/2019 | Wang et al. |
| 2019/0313441 A1 | 10/2019 | Zhu et al. |
| 2021/0266974 A1 | 8/2021 | Taherzadeh Boroujeni et al. |
| 2022/0247477 A1* | 8/2022 | Ryu .................... H04W 72/046 |
| 2023/0105291 A1* | 4/2023 | Abedini ............ H04W 74/0841 370/329 |

FOREIGN PATENT DOCUMENTS

| | | |
|---|---|---|
| CN | 109923823 A | 6/2019 |
| WO | WO 2020/256934 A1 | 12/2020 |
| WO | WO 2020/259838 A1 | 12/2020 |
| WO | WO-2022/051182 A1 | 3/2022 |
| WO | WO 2022/061239 A1 | 3/2022 |

OTHER PUBLICATIONS

3$^{rd}$ Generation Partnership Project; "Technical Specification Group Radio Access Network; NR; Physical layer procedures for data (Release 17)," 3GPP TS 38.214 V17.1.0, Mar. 2022.

* cited by examiner

*Primary Examiner* — Khalid W Shaheed
(74) *Attorney, Agent, or Firm* — McCarter & English LLP

(57) ABSTRACT

An apparatus, including at least one processor, and at least one memory storing instructions, the at least one memory and the instructions configured to, with the at least one processor, cause a network device to determine excess resources available for uplink transmissions to the network device and to use at least a portion of the excess resources for a beam refinement process associated with at least one radio beam usable for an information exchange with at least one terminal device.

10 Claims, 5 Drawing Sheets

APPARATUS COMPRISING AT LEAST ONE PROCESSOR

FIELD OF THE DISCLOSURE

Figure 1A:
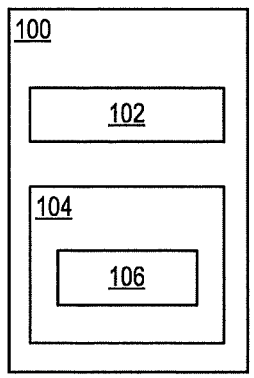

Various example embodiments relate to an apparatus comprising at least one processor.

Further embodiments relate to a method of operating related to such apparatus.

BACKGROUND

A growing demand of high-speed wireless transmission drives an expansion of e.g. cellular communication to higher frequency bands such as millimeter waves (mmWave), where comparatively wide spectrum (e.g. hundreds of MHz) is available. Large antenna arrays can e.g. be used in 5G communication systems, and they may also be considered to be used with future 6G communication systems, for example in the mid and high frequency bands.

Beam management and/or beam refinement of large antenna arrays can be complex.

SUMMARY

Various embodiments of the disclosure are set out by the independent claims. The exemplary embodiments and features, if any, described in this specification, that do not fall under the scope of the independent claims, are to be interpreted as examples useful for understanding various exemplary embodiments of the disclosure.

Some exemplary embodiments relate to an apparatus, comprising at least one processor, and at least one memory storing instructions, the at least one memory and the instructions configured to, with the at least one processor, cause a network device to determine excess resources available for uplink transmissions to the network device and to use at least a portion of the excess resources for a beam refinement process associated with at least one radio beam usable for an information exchange with at least one terminal device.

In some exemplary embodiments, the apparatus may be an apparatus for a wireless communications network, e.g. according to the 5G and/or 5G Advanced and/or 6G type or of other types. In some embodiments, the apparatus and/or its functionality may e.g. be provided at a base station, e.g. gNB, e.g. for a cellular communications network.

In some exemplary embodiments, the excess resources are at least one of a) under-utilized resources, b) over-provisioned resources for uplink transmissions to the network device.

In some exemplary embodiments, a wireless network may e.g. be under-utilized, e.g. may comprise under-utilized resources, which e.g. allows to define a procedure to increase uplink allocations e.g. of terminal devices or mobile users, e.g. to allow a network device, e.g. gNB, to probe receive beams, e.g. additional receive beams, e.g. while the terminal device or mobile is transmitting.

In some exemplary embodiments, resource overprovisioning may be given for a wireless network, e.g. using cellular communications, which may e.g. be driven by at least one of: 1) providing redundancy, e.g. to overcome uncertainties (e.g., fading, interference) in a link budget, e.g. to ensure reliable transmission at least most of the time; 2) underestimation of channel quality, e.g. during a CSI (channel state information) acquisition process.

Some exemplary embodiments may leverage such resources, e.g. excess resources, either under-utilized or over-provisioned, e.g. to perform beam refinement operations, e.g. without any additional complexity increase for the terminal device side.

In some exemplary embodiments, the excess resources are associated with at least one of a) a control channel, b) a data channel.

In some exemplary embodiments, the instructions, when executed by the at least one processor, cause the network device to determine an amount of the excess resources to be used for a beam refinement process associated with a specific terminal device, and to allocate the amount of the excess resources for at least one signal transmission by the specific terminal device.

In some exemplary embodiments, respective amounts of excess resources may e.g. be allocated to different specific terminal devices.

In some exemplary embodiments, the instructions, when executed by the at least one processor, cause the network device to perform beam sweeping on the allocated amount of excess resources, and to determine a refined beam direction based on the beam sweeping, e.g. for at least one of the specific terminal devices.

In some exemplary embodiments, the instructions, when executed by the at least one processor, cause the network device to instruct the at least one terminal device to perform at least one uplink transmission to the network device using the excess resources.

In some exemplary embodiments, the instructions, when executed by the at least one processor, cause the network device to probe at least one radio beam associated with the at least one uplink transmission.

In some exemplary embodiments, the instructions, when executed by the at least one processor, cause the network device to determine a beam sweeping set characterizing a plurality of different radio beams to be used for beam sweeping for the beam refinement process, to perform beam sweeping based on the beam sweeping set, and to determine a refined beam direction based on beam sweeping according to the beam sweeping set.

In some exemplary embodiments, the instructions, when executed by the at least one processor, cause the network device to lower a modulation and coding scheme associated with the at least one terminal device, e.g. the modulation and coding scheme at which the at least one terminal device transmits, thus e.g. making these transmissions of the at least one terminal device using more resources, e.g. making these transmissions of the at least one terminal device more robust, e.g. for a data channel. In some embodiments, an increased number of uplink reference signals (e.g. pilot signals, SRS) can be allocated by the network device, e.g. for control channel excess resources.

Some exemplary embodiments relate to an apparatus comprising means for determining, by a network device, excess resources available for uplink transmissions to the network device and for using at least a portion of the excess resources for a beam refinement process associated with at least one radio beam usable for an information exchange with at least one terminal device. In some embodiments, the means for determining, by a network device, excess resources available for uplink transmissions to the network device may e.g. comprise at least one processor, and at least one memory storing instructions, the at least one memory and the instructions configured to, with the at least one processor, perform the step of determining the excess resources available for uplink transmissions to the network device.

Some exemplary embodiments relate to a method comprising: determining, by a network device, excess resources available for uplink transmissions to the network device, and using at least a portion of the excess resources for a beam refinement process associated with at least one radio beam usable for an information exchange with at least one terminal device.

Some exemplary embodiments relate to an apparatus, comprising at least one processor, and at least one memory storing instructions, the at least one memory and the instructions configured to, with the at least one processor, cause a terminal device to receive an instruction to perform at least one uplink transmission to a network device using excess resources determined by the network device, and to perform the at least one uplink transmission to the network device using the excess resources determined by the network device.

In some exemplary embodiments, the apparatus may be an apparatus for a wireless communications network, e.g. according to the 5G and/or 5G Advanced and/or 6G type or of other types. In some embodiments, the apparatus and/or its functionality may e.g. be provided at a terminal device, e.g. user equipment, e.g. for a cellular communications network.

Some exemplary embodiments relate to an apparatus comprising means for receiving, by a terminal device, an instruction to perform at least one uplink transmission to a network device using excess resources determined by the network device, and for performing the at least one uplink transmission to the network device using the excess resources determined by the network device.

In some exemplary embodiments, the means for receiving the instruction may e.g. comprise at least one processor, and at least one memory storing instructions, the at least one memory and the instructions configured to, with the at least one processor, perform the step of receiving the instruction.

Some exemplary embodiments relate to a method, comprising receiving, by a terminal device, an instruction to perform at least one uplink transmission to a network device using excess resources determined by the network device, and performing the at least one uplink transmission to the network device using the excess resources determined by the network device.

Further exemplary embodiments relate to a network device, e.g. gNB, comprising at least one apparatus according to the embodiments.

Further exemplary embodiments relate to a terminal device, e.g. user equipment, comprising at least one apparatus according to the embodiments.

Further exemplary embodiments relate to a wireless communication system comprising at least one of: a) an apparatus according to the embodiments, b) a network device according to the embodiments, c) a terminal device according to the embodiments.

Further embodiments relate to a computer program or computer program product comprising instructions which, when the program is executed by a computer, cause the computer to carry out the method according to the embodiments.

Further exemplary embodiments relate to a data carrier signal carrying and/or characterizing the instructions. In some embodiments, the instructions may e.g. be provided in the form of at least one computer program.

BRIEF DESCRIPTION OF EXEMPLARY FIGURES

Figure 1B:
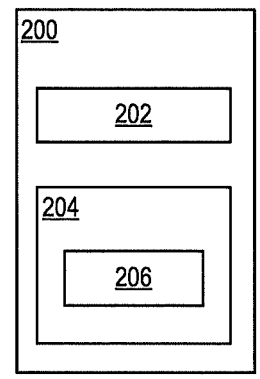
Figure 2:
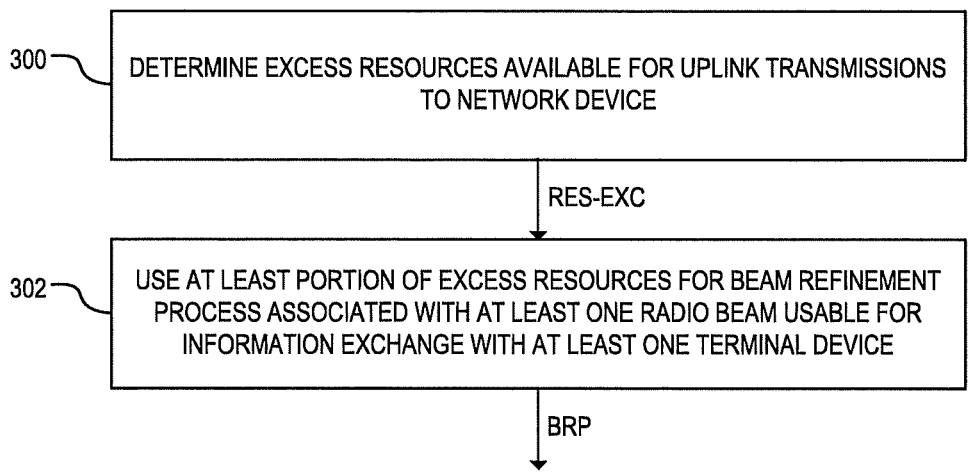
Figure 3:
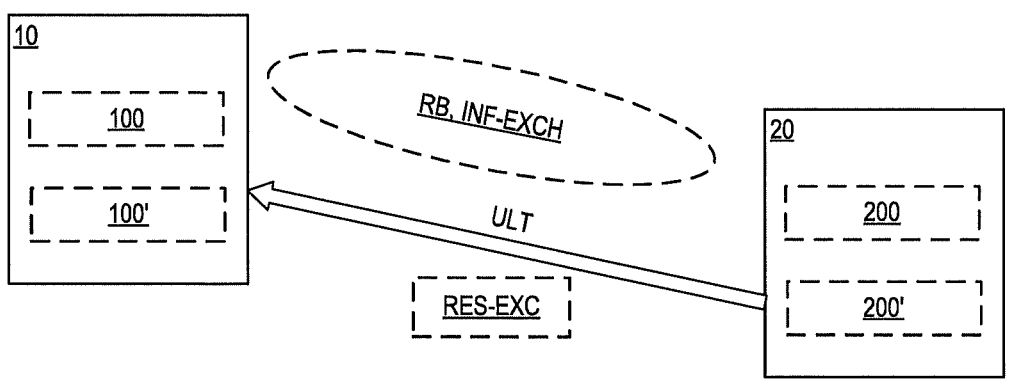
Figure 4:
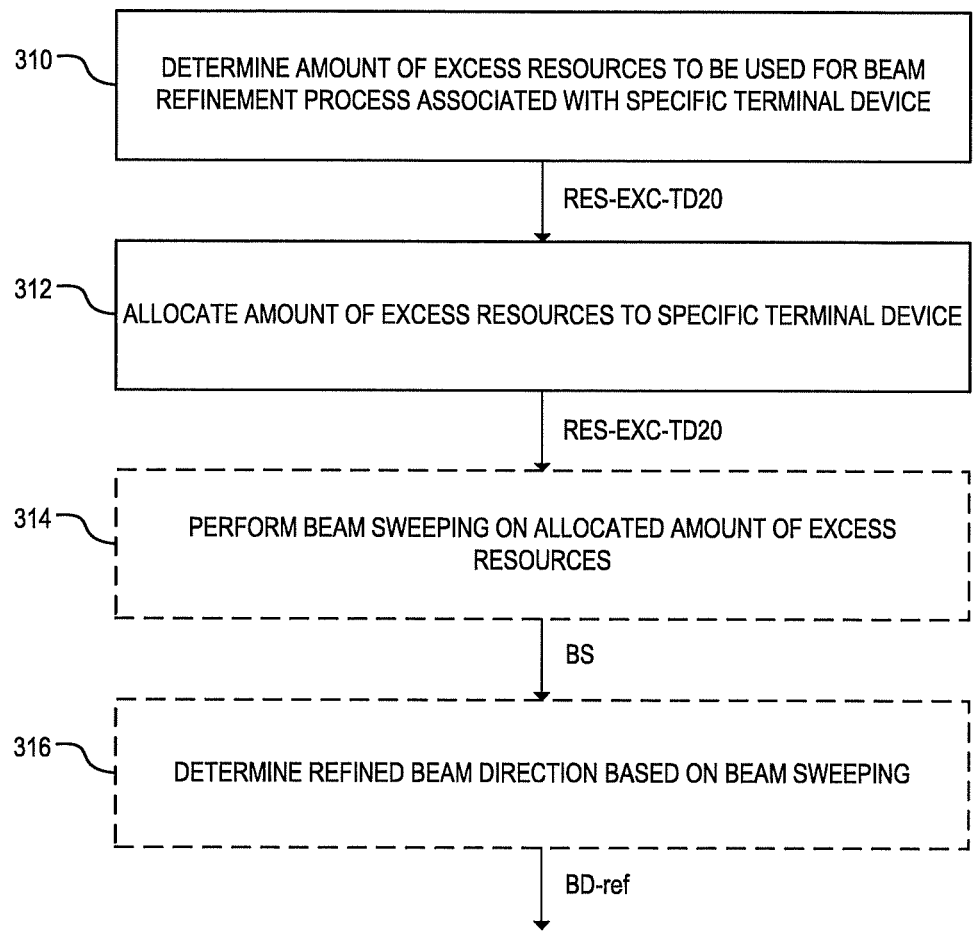
Figure 5:
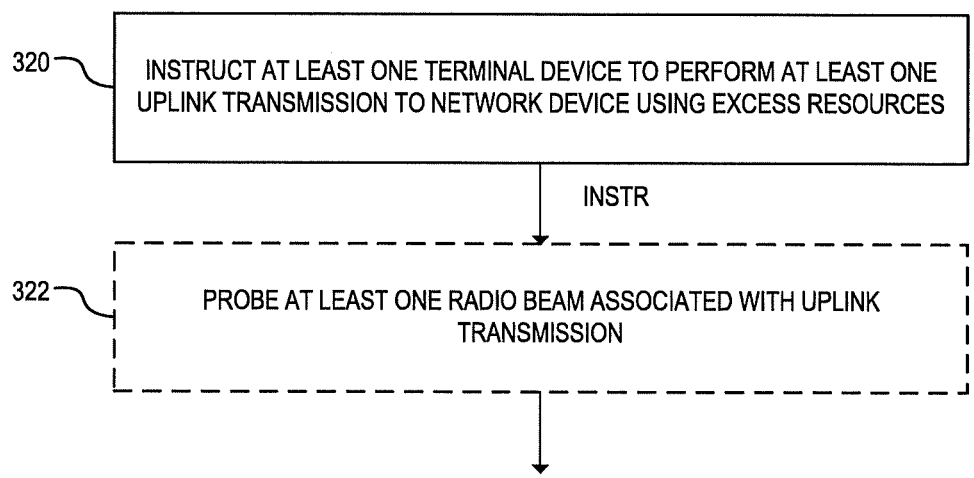
Figure 6:
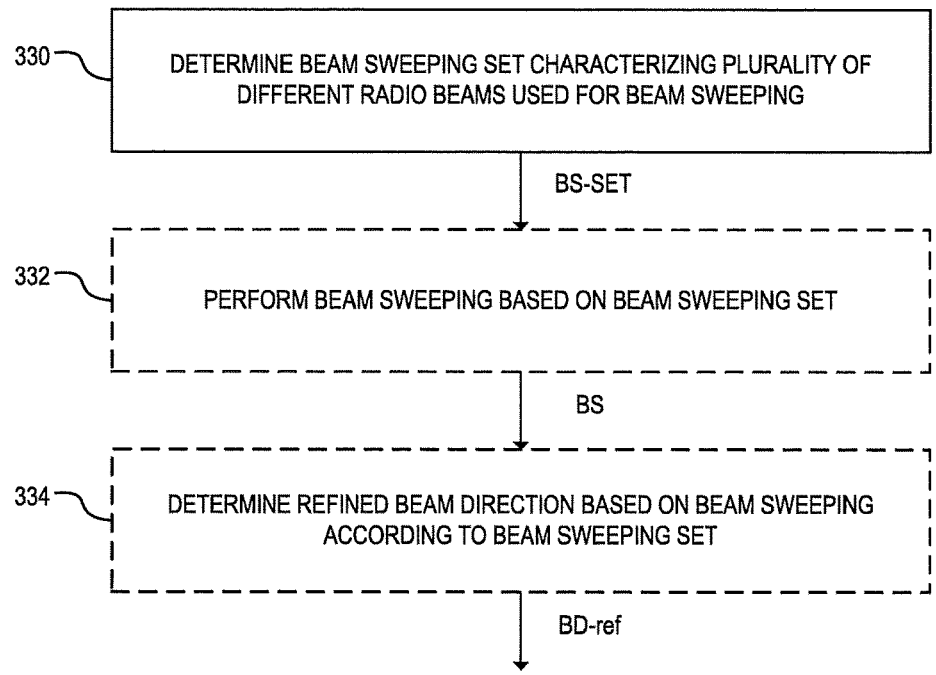
Figure 7:
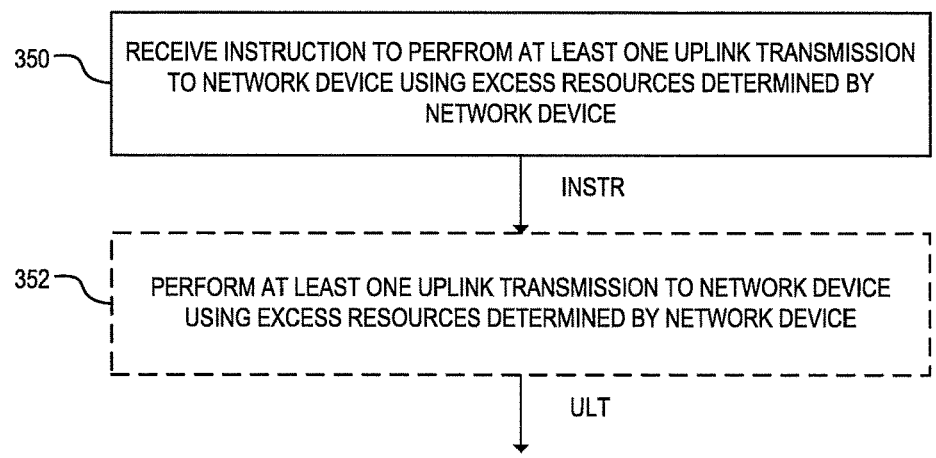
Figure 8A:
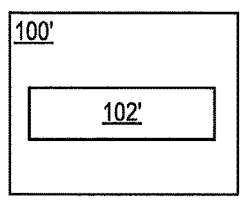
Figure 8B:
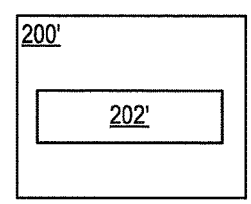
Figure 9A:
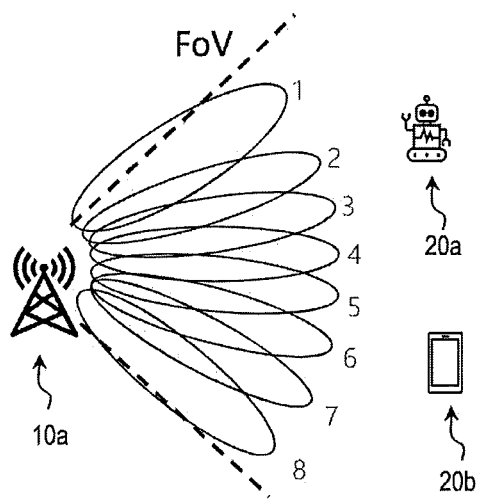
Figure 9B:
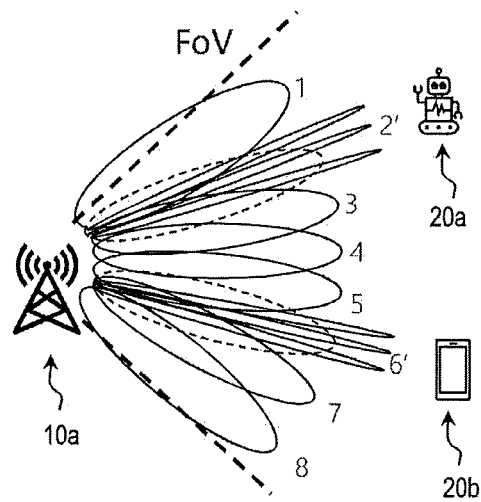
Figure 10:
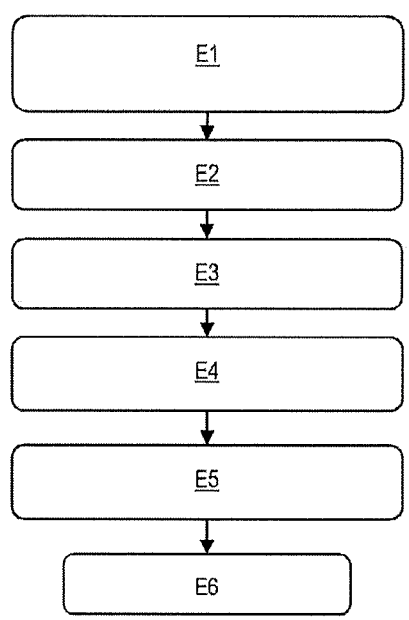
Figure 11:
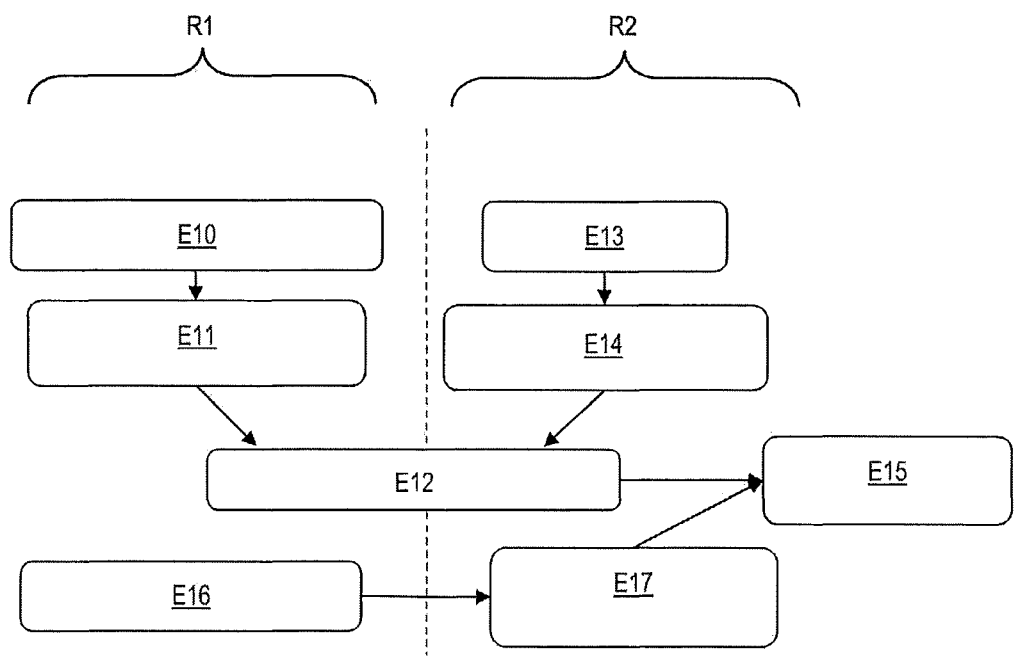
Figure 12:
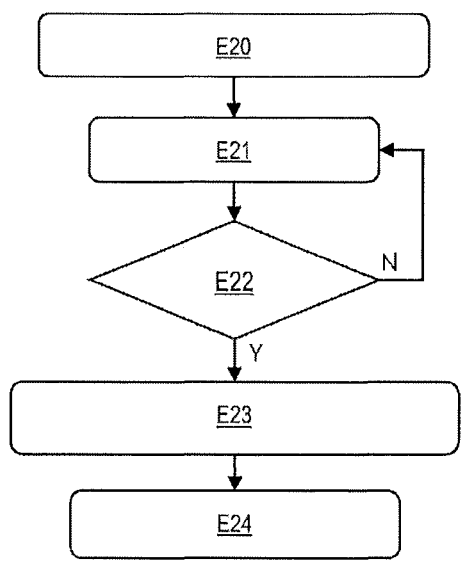

FIG. 1A schematically depicts a simplified block diagram according to some embodiments, FIG. 1B schematically depicts a simplified block diagram according to some embodiments, FIG. 2 schematically depicts a simplified flow chart according to some embodiments, FIG. 3 schematically depicts a simplified block diagram according to some embodiments, FIG. 4 schematically depicts a simplified flow chart according to some embodiments, FIG. 5 schematically depicts a simplified flow chart according to some embodiments, FIG. 6 schematically depicts a simplified flow chart according to some embodiments, FIG. 7 schematically depicts a simplified flow chart according to some embodiments, FIG. 8A schematically depicts a simplified block diagram according to some embodiments, FIG. 8B schematically depicts a simplified block diagram according to some embodiments, FIG. 9A schematically depicts a simplified diagram according to some embodiments, FIG. 9B schematically depicts a simplified diagram according to some embodiments, FIG. 10 schematically depicts a simplified flow chart according to some embodiments, FIG. 11 schematically depicts a simplified flow chart according to some embodiments, FIG. 12 schematically depicts a simplified flow chart according to some embodiments.

DESCRIPTION OF SOME EXEMPLARY EMBODIMENTS

Some exemplary embodiments, see FIG. 1, relate to an apparatus 100, comprising at least one processor 102, and at least one memory 104 storing instructions 106, e.g. in form of at least one computer program, the at least one memory 104 and the instructions 106 configured to, with the at least one processor 102, cause a network device 10 (FIG. 3) to determine 300 (FIG. 2) excess resources RES-EXC available for uplink transmissions ULT to the network device 10 and to use 302 (FIG. 2) at least a portion of the excess resources RES-EXC for a beam refinement process BRP associated with at least one radio beam RB (FIG. 3) usable for an information exchange INF-EXCH with at least one terminal device 20.

In some exemplary embodiments, the apparatus 100 may be an apparatus for a wireless communications network, e.g. according to the 5G and/or 5G Advanced and/or 6G type or of other types. In some embodiments, the apparatus 100 and/or its functionality may e.g. be provided at a network device 10, e.g. base station, e.g. gNB, e.g. for a cellular communications network.

In some exemplary embodiments, the excess resources RES-EXC are at least one of a) under-utilized resources, b) over-provisioned resources for uplink transmissions ULT to the network device.

In some exemplary embodiments, a wireless network may e.g. be under-utilized, e.g. may comprise under-utilized resources, which e.g. allows to define a procedure to increase uplink allocations e.g. of terminal devices 20 or mobile users, e.g. to allow a network device, e.g. gNB, 10 to probe receive beams, e.g. additional receive beams, e.g. while the terminal device 20 or mobile is transmitting.

In some exemplary embodiments, the excess resources RES-EXC may e.g. comprise at least one of: a) time resources, b) frequency resources.

In some exemplary embodiments, resource overprovisioning may be given for a wireless network, e.g. using cellular communications, which may e.g. be driven by at least one of: 1) providing redundancy, e.g. to overcome uncertainties (e.g., fading, interference) in a link budget, e.g. to ensure reliable transmission at least most of the time; 2) underestimation of channel quality, e.g. during a CSI (channel state information) acquisition process.

Some exemplary embodiments may leverage such resources, e.g. excess resources RES-EXC, either under-utilized or over-provisioned, e.g. to perform beam refinement operations, e.g. without any additional complexity increase for the terminal device side.

In some exemplary embodiments, the excess resources RES-EXC are associated with at least one of a) a control channel, b) a data channel.

In some exemplary embodiments, FIG. 4, the instructions 106, when executed by the at least one processor 102, cause the network device 10 to determine 310 an amount RES-EXC-TD20 of the excess resources RES-EXC to be used for a beam refinement process associated with a specific terminal device 20, and to allocate 312 the amount RES-EXC-TD20 of the excess resources for at least one signal transmission by the specific terminal device 20. In some embodiments, this way, it may be controlled which terminal device 20 may be used for supporting the beam refinement process and/or to which degree a specific terminal device 20 may be used for supporting the beam refinement process.

In some exemplary embodiments, respective amounts of excess resources RES-EXC may e.g. be allocated to different specific terminal devices.

In some exemplary embodiments, FIG. 4, the instructions 106, when executed by the at least one processor 102, cause the network device 10 to perform 314 beam sweeping BS on the allocated amount RES-EXC-TD20 of excess resources, and to determine 316 a refined beam direction BD-ref based on the beam sweeping BS, e.g. for at least one of the specific terminal devices 20.

In some exemplary embodiments, FIG. 5, the instructions 106, when executed by the at least one processor 102, cause the network device 10 to instruct 320 the at least one terminal device 20 to perform at least one uplink transmission ULT to the network device 10 using the excess resources RES-EXC.

In some exemplary embodiments, FIG. 5, the instructions 106, when executed by the at least one processor 102, cause the network device 10 to probe 322 at least one radio beam associated with the at least one uplink transmission ULT.

In some exemplary embodiments, FIG. 6, the instructions 106, when executed by the at least one processor 102, cause the network device 10 to determine 330 a beam sweeping set BS-SET characterizing a plurality of different radio beams RB (FIG. 3) to be used for beam sweeping for the beam refinement process BRP, to perform 332 beam sweeping BS based on the beam sweeping set BS-SET, and to determine 334 a refined beam direction BD-ref based on beam sweeping BS according to the beam sweeping set BS-SET.

In some exemplary embodiments, the instructions 106, when executed by the at least one processor 102, cause the network device 10 to lower a modulation and coding scheme (see for example element E14 of FIG. 11 explained further below) associated with the at least one terminal device 20, e.g. the modulation and coding scheme at which the at least one terminal device 20 transmits, thus e.g. making these transmissions of the at least one terminal device 20 using more resources, e.g. making these transmissions of the at least one terminal device more robust, e.g. for a data channel. In some embodiments, an increased number of uplink reference signals (e.g. pilot signals, SRS) can be allocated by the network device 10, e.g. for control channel excess resources.

Some exemplary embodiments, FIG. 8A, relate to an apparatus 100' comprising means 102' for determining 300 (FIG. 3), by a network device 10, excess resources RES-EXC available for uplink transmissions ULT to the network device 10 and for using 302 at least a portion of the excess resources for a beam refinement process BRP associated with at least one radio beam RB usable for an information exchange INF-EXCH with at least one terminal device 20. In some embodiments, the means 102' (FIG. 8A) for determining, by a network device, excess resources available for uplink transmissions to the network device may e.g. comprise at least one processor 102 (FIG. 1A), and at least one memory 104 storing instructions 106, the at least one memory 104 and the instructions 106 configured to, with the at least one processor 102, perform the step of determining the excess resources available for uplink transmissions to the network device.

Some exemplary embodiments, FIG. 2, relate to a method comprising: determining 300, by a network device, excess resources available for uplink transmissions to the network device, and using 302 at least a portion of the excess resources for a beam refinement process associated with at least one radio beam usable for an information exchange with at least one terminal device.

Some exemplary embodiments, FIG. 1B, relate to an apparatus 200, comprising at least one processor 202, and at least one memory 204 storing instructions 206, the at least one memory 204 and the instructions 206 configured to, with the at least one processor 202, cause a terminal device 20 (FIG. 3) to receive 350 (FIG. 7) an instruction INSTR to perform at least one uplink transmission ULT to a network device 10 using excess resources RES-EXC determined by the network device 10, and to perform 352 the at least one uplink transmission ULT to the network device 10 using the excess resources RES-EXC determined by the network device 10.

In some exemplary embodiments, the apparatus 200 may be an apparatus for a wireless communications network, e.g. according to the 5G and/or 5G Advanced and/or 6G type or of other types. In some embodiments, the apparatus 200 and/or its functionality may e.g. be provided at a terminal device 20 (FIG. 3), e.g. user equipment, e.g. for a cellular communications network.

Some exemplary embodiments, FIG. 8B, relate to an apparatus 200' comprising means 202' for receiving 350, by a terminal device 20, an instruction INSTR to perform at least one uplink transmission ULT to a network device 10 using excess resources RES-EXC determined by the network device 10, and for performing 352 the at least one uplink transmission ULT to the network device 10 using the excess resources RES-EXC determined by the network device 10.

In some exemplary embodiments, the means 202' for receiving the instruction may e.g. comprise at least one processor 202, and at least one memory 204 storing instructions 206, the at least one memory 204 and the instructions 206 configured to, with the at least one processor 202, perform the step of receiving 350 the instruction INSTR.

Some exemplary embodiments, FIG. 7, relate to a method, comprising receiving 350, by a terminal device 20, an instruction INSTR to perform at least one uplink transmission ULT to a network device 10 using excess resources RES-EXC determined by the network device 10, and performing 352 the at least one uplink transmission ULT to the network device 10 using the excess resources RES-EXC determined by the network device 10.

Further exemplary embodiments relate to a network device 10, e.g. gNB, comprising at least one apparatus 100, 100' according to the embodiments.

Further exemplary embodiments relate to a terminal device 20, e.g. user equipment, comprising at least one apparatus 200, 200' according to the embodiments.

Further exemplary embodiments relate to a wireless communication system, see for example FIG. 3, comprising at least one of: a) an apparatus 100, 100', 200, 200' according to the embodiments, b) a network device 10 according to the embodiments, c) a terminal device 20 according to the embodiments.

Further embodiments relate to a computer program or computer program product comprising instructions which, when the program is executed by a computer, cause the computer to carry out the method according to the embodiments.

Further exemplary embodiments relate to a data carrier signal carrying and/or characterizing the instructions 106, 206. In some embodiments, the instructions may e.g. be provided in the form of at least one computer program.

FIG. 9A schematically depicts a simplified diagram according to some embodiments, indicating a network device 10a using different radio beams, e.g. to find the best beam direction by first sweeping over a predefined beam set such as e.g. characterized by SSB beam broadcasting according to some accepted standard, e.g. in a downlink transmission direction, and then e.g. listening to a respective report from serving user terminals.

In some embodiments, as an example, radio beam 2 may e.g. be used for an information exchange between the network device 10a and a first terminal device 20a, whereas radio beam 6 may be used for an information exchange between the network device 10a and a second terminal device 20b.

The dashed lines symbolize a field of view of the network device 10a.

FIG. 9B schematically depicts a simplified diagram according to some embodiments, similar to FIG. 9A, but additionally depicting aspects of a beam refinement procedure, wherein refined beams 2', 6'—as e.g. compared to beams 2, 6 of FIG. 9A—may be obtained, e.g. using the principle according to the embodiments.

While some conventional beam refinement approaches may require new control resources, e.g. dedicated to SSB (Synchronization Signal Block) transmission, the principle according to the embodiments enables to leverage e.g. overprovisioned resources, e.g. in uplink data channels (e.g. PUSCH in 5G) and/or uplink control channels to take measurements for beam refinement.

FIG. 10 schematically depicts a simplified flow chart according to some embodiments. Element E1 symbolizes identifying resources, either control channel (e.g., CSI-RS, Channel State Information Reference Signal) or data channel (e.g., PUSCH, Physical Uplink Shared Channel), that are either under-utilized or over-provisioned. Element E2 symbolizes determining an amount of (excess) resources that can e.g. be re-purposed, e.g. per terminal device or mobile, e.g. to perform beam refinement. Element E3 symbolizes allocating determined excess resources to uplink transmissions ULT for beam refinement by the terminal device(s) 20. Element E4 symbolizes the terminal device(s) performing the uplink transmissions ULT using the allocated excess resources. Element E5 symbolizes the gNB 10 probing e.g. additional beams (e.g., being associated with different angles and/or with different beam shapes), e.g. during the uplink transmission ULT by the terminal device(s) 20 using the allocated excess resources, e.g. measuring beam gains and/or beam coefficients. Element E6 symbolizes determining a new, e.g. refined, beam or beam direction to be used, e.g. for future uplink and/or downlink transmissions based on the measurements of block E5.

FIG. 11 schematically depicts a simplified flow chart according to some embodiments, wherein a first region R1 indicates periodic aspects, and wherein a second region R2 indicates real time or near real time aspects according to some embodiments.

Element E10 symbolizes determining a quality, e.g. based on CSI-RS. Element E11 symbolizes concluding that there is "redundant" or excess reference signal transmission, if the quality determined by block E10 is good, i.e. exceeds a threshold. Element E12 symbolizes determining redundant or excess transmissions. Element E13 symbolizes determining a modulation and coding scheme, MCS. Element E14 symbolizes determining to lower the used MCS, e.g. to increase redundancy, e.g. if there is a resource under-use. Element E15 symbolizes probing neighbor beams, e.g. upon reception of redundant signals, and determining a new beam or beam direction.

Element E16 symbolizes finding a best serving beam. Element E17 symbolizes transmitting with a current best beam.

In other words, in some embodiments, over-provisioned resources are identified by periodically checking the quality of CSI-RS, see element E10, and under-utilized resources are identified and allocated for UL transmission with lower MCS using the aspects of FIG. 10.

In some embodiments, at least some of the following aspects and advantages may be provided by employing the principle according to the embodiments:

absence of additional complexity at the user equipment side, nor additional signaling required beyond what has already been standardized, removing obstacles for the technique's adoption, a beam refinement reduced latency since there is no need to wait for comparatively long narrow beam sweeps in the, in some conventional systems' scarce, control channel resources.

In some embodiments, some additional transmissions may be performed by the mobile 20 (e.g., for a procedure based on control channel measurements), and in some cases, this may slightly impact an energy consumption. However, in some embodiments, the beam power gains due to better beam alignment based on the principle according to the embodiments can compensate for the potential (and e.g. minor) energy consumption increase.

In the following, further advantages and exemplary embodiments are provided which, in some embodiments, may e.g. be combined with one or more of the aforementioned aspects and embodiments.

In some embodiments, additional resources or excess resources associated with at least one data channel (e.g. PUSCH) can be used, e.g. for the beam refinement process BRP (FIG. 2).

In some cases, a wireless system may not be fully loaded. For example, in some systems, in urban areas a resource utilization may be typically well below 50%. In some cases, resource under-utilization can e.g. be leveraged by the network for energy efficiency or interference stabilization.

In some embodiments, the network device 10 may e.g. identify excess resources or excess radio resources (either due to under-utilization over over-provision) and then instruct one or more user terminals 20 to transmit over the identified excess radio resources, e.g. to facilitate uplink beam refinement. For instance, if more resources are available, the network device may assign a more conservative Modulation and Coding Scheme (MCS) to a transmission. In this way, in some embodiments, the transmission would be more robust, being able to tolerate lower SINR on the whole transmission, or on few resource elements.

In some embodiments, the network device 10 may e.g. receive the uplink transmission ULT as usual, e.g. for most of the symbols, and may e.g. use few of the received symbols to probe different beam(s), e.g. measuring at least one of: the received power, SINR (Signal to Interference plus Noise Ratio), or any other signal quality measure. Given the additional robustness of the transmission, in some embodiments, even if the different beam(s) probed deliver a bad signal quality, the transmission may e.g. be able to be decoded. In some embodiments, if the original MCS had a rate $r_0$ and the new selected MCS has a rate $r_1 < r_0$, a fraction $$\left(e.g., \text{up to } \frac{r_0 - r_1}{r_0}\right)$$

of the total beams may be used for uplink beam refinement probing.

Note that the proposed method according to some embodiments would not hinder system performance, e.g. due to bad quality of the data/RS transmitted when wrong beams are being used during an uplink beam refinement. For instance, in some embodiments, an estimated signal quality may e.g. be input to a decoder, e.g. helping the decoder to discriminate a transmission part with good quality and bad quality. In some embodiments, this enables to improve the decoder's consideration of the good symbols and, on the other hand, to reject transmissions occurring on worse beams.

In some embodiments, different beams may be probed without lowering the MCS, which, however may have an impact on the transmission's reliability, e.g. degrading it and, in some cases, not allowing to keep a desired quality of service of the transmission.

In some embodiments, additional resources or excess resources can e.g. be determined and used in a control channel (e.g. SRS).

In some embodiments, e.g. if there are enough resources, e.g. excess resources, for a control channel or for uplink reference signals (e.g. SRS), these excess resources can be allocated to terminal devices 20. While the terminal devices 20 transmit over these additional resources, in some embodiments, the network device 10 may e.g. use the transmission, e.g. to probe new beams and measure their quality.

In some embodiments, the received information over these additional or excess resources (e.g. channel estimate with SRS) can be used at the network device, e.g. after weighting based on the quality, like receive signal power, SINR, etc . . . .

In some embodiments, the first beams to be probed should be the ones close to the currently selected SSB (e.g., wider) or refined beam (e.g., narrower). For instance, in some embodiments, an angular space may be sampled, i.e. uniformly in a Normalized Angular Domain (NAF), defined as $$\phi = \frac{\sin\theta}{2},$$

where $\theta$ is the incident angle.

In some embodiments, e.g. if an antenna array is configured to perform beamforming in two directions such as e.g. azimuth and elevation, a sampling of the angular space may be done uniformly, e.g. in a grid, along the two directions.

In some embodiments, using the NAF allows to have a transformed angular representation, where a beamforming resolution is constant, as e.g. opposed to what happens in the angular domain, e.g. by sampling uniformly in the angular domain, e.g. represented by angle $\theta$, where better performance is achieved at the array's boresight, i.e. $\theta=0$.

In the following, further aspects and details on which beams may be probed in some embodiments are given.

In some embodiments, a size of the beam sweeping set BS-SET (FIG. 6), e.g. characterizing how many beams are to be probed, can be determined heuristically, e.g. based on at least some of the embodiments explained above.

In some embodiments, one example is to determine a number of beams based on a resource amount and on a beam sweeping speed.

In some embodiments, e.g. if beam sweeping may be done on a symbol-by-symbol basis, a beam sweeping set may be assigned with as many beams as the number of symbols supported by the identified excess resource. In some embodiments, more or fewer beams may be used or assigned, respectively, e.g. if the beam sweeping speed is faster/slower.

In some embodiments, an angular range of the beam sweeping, e.g. for the beam refinement procedure BRP, may also be determined heuristically. In some embodiments, all beams may be packed to cover e.g. only the SSB beam currently in use (i.e., the best beam identified after SSB beam sweeping according to some accepted standard). In some other embodiments, two neighboring beams may be covered by the angular range of the beam sweeping, e.g. if the terminal device 20 reported that a signal strength of the two neighboring beams are similar.

In some embodiments, beam patterns and/or beam pointing directions may e.g. be determined by uniform-in-angular domain methods, where the half power beam width (HPBW) is e.g. chosen such that the beams are uniformly spaced apart, e.g. by roughly HPBW distance in angular domain and cover e.g. the entire desired angular range.

In some embodiments, beams may also be arranged in the normalized angular frequency (NAF) domain, e.g. with controlled beam overlapping.

In some embodiments, e.g. if a currently selected beam is experiencing fading, e.g. significant fading, the network device 10 may e.g. opt for using wider beams, e.g. SSB to probe a wider angular/NAF range and have higher chances to find a good alternative as serving beam.

In some embodiments, since the beam sweep or beam scan is done at the network device 10, e.g. gNB, it is not required to rely on any signaling from the terminal device 20 e.g. to report back measurements to the gNB 10.

FIG. 12 schematically depicts a simplified flow chart according to some embodiments, illustrating aspects of beam refinement.

Element E20 symbolizes the network device 10 (FIG. 3) broadcasting SSB beams and the terminal device 20 reporting at least one of: a best SSB ID, CQI, etc. Element E21 symbolizes the network device 10 receiving uplink signal(s) from the terminal device 20 via the selected SSB beam. Element E22 symbolizes determining whether there are excess resources RES-EXC. If not, the procedure continues with Element E21. If the determination E22 yields that there are excess resources RES-EXC, the procedure continues with element E23, which symbolizes the network device 10 determining a beam sweeping set BS-SET for a beam refinement procedure based on the available excess resources as e.g. characterized by redundant uplink transmissions. Element E24 symbolizes the terminal device 20 performing uplink transmissions ULT, the network device 10 performing a beam scan or beam sweep, respectively, and determining a refined beam direction based on the beam sweep.

In some embodiments, excess resources, e.g. usable for probing beams in the uplink direction, may be determined based on aspects of the procedure according to FIG. 11.

In some embodiments, the principle according to the embodiments may be used to improve a beam refinement process. As an example, after determining the main beam(s) to be used to serve a mobile terminal 20, typically with SSB sweeps, the gNB 10 can further refine the beam(s) used to serve the same mobile terminal 20 with additional procedures according to the embodiments.

In this way, in some embodiments, the beam direction and its confidence can be improved, allowing to use narrower beams thus improving a nominal directional gain. At the same time, an improved beam direction's confidence may reduce an undesired misalignment error and, thus, further improves the overall beam gains. In some embodiments, additional advantages can also be achieved due to a better matching of a beam pattern to a channel's angular dispersion.

While some conventional approaches of beam refining rely on additional mobile user complexity and/or higher signaling overhead, e.g. increasing downlink control channel overhead and the resources used in downlink for beam estimation and refinement, the principle according to the embodiments may help to avoid these disadvantages by determining excess resources, e.g. overprovisioned and/or underutilized uplink resources, and e.g. by repurposing and/or reusing them as uplink signals, e.g. in the sense of "pilots", e.g. to facilitate beam refinement.

The invention claimed is:

1. An apparatus, comprising:
at least one processor; and
at least one memory storing instructions that, when executed with the at least one processor, cause a network device to:
determine excess resources available for uplink transmissions to the network device; and
determine a portion of the excess resources to be used for a beam refinement process associated with a specific terminal device of at least one terminal device,
use at least a the portion of the excess resources for the beam refinement process associated with at least one radio beam usable for at least one signal transmission and an information exchange with at least one the specific terminal device,
wherein the excess resources are associated with at least one of a control channel or a data channel, and
wherein the instructions, when executed with the at least one processor, cause the network device to perform beam sweeping on an allocated amount of excess resources, and to determine a refined beam direction based on the beam sweeping.

2. The apparatus according to claim 1, wherein the excess resources are at least one of under-utilized resources or over-provisioned resources for uplink transmissions to the network device.

3. The apparatus according to claim 1, wherein the instructions, when executed with the at least one processor, cause the network device to instruct the specific terminal device of the at least one terminal device to perform at least one uplink transmission to the network device using the excess resources.

4. The apparatus according to claim 3, wherein the instructions, when executed with the at least one processor, cause the network device to probe at least one radio beam associated with the at least one uplink transmission.

5. The apparatus according to claim 1, wherein the instructions, when executed with the at least one processor, cause the network device to determine a beam sweeping set characterizing a plurality of different radio beams to be used for beam sweeping for the beam refinement process, to perform beam sweeping based on the beam sweeping set, and to determine a refined beam direction based on beam sweeping according to the beam sweeping set.

6. The apparatus according to claim 1, wherein the instructions, when executed with the at least one processor, cause the network device to lower a modulation and coding scheme associated with the specific terminal device of the at least one terminal device.

7. An apparatus, comprising:
at least one processor; and
at least one memory storing instructions that, when executed with the at least one processor, cause the apparatus to:
receive with a terminal device, an instruction to perform at least one uplink transmission to a network device using excess resources for a beam refinement process associated with at least one radio beam determined with the network device,
wherein a portion of the excess resources are used for the beam refinement process associated with the at least one radio beam, and
perform the at least one uplink transmission using the at least one radio beam for at least one signal transmission and an information exchange to the network device using the excess resources determined with the network device,
wherein the excess resources are associated with at least one of a control channel or a data channel, and
wherein the instructions, when executed with the at least one processor, cause the network device to perform beam sweeping on an allocated amount of excess resources, and to determine a refined beam direction based on the beam sweeping.

8. A network device, comprising at least one apparatus according to claim 1.

9. A terminal device, comprising at least one apparatus according to claim 7.

10. A non-transitory computer readable medium comprising program instructions which, when executed by an apparatus, cause the apparatus to perform at least the following:
cause a network device to determine excess resources available for uplink transmissions to the network device,
wherein the excess resources are for a beam refinement process associated with at least one radio beam; and
use at least a portion of the excess resources for the beam refinement process associated with at least one radio beam usable for at least one signal transmission and an information exchange with at least one terminal device,
wherein the excess resources are associated with at least one of a control channel or a data channel, and
wherein the instructions, when executed with the at least one processor, cause the network device to perform beam sweeping on an allocated amount of excess resources, and to determine a refined beam direction based on the beam sweeping.

\* \* \* \* \*